UNITED STATES PATENT OFFICE.

GEORGE WILLIAM CUTLER WEBB, OF DARTFORD, ENGLAND, ASSIGNOR TO VICKERS LIMITED, OF WESTMINSTER, ENGLAND.

INCENDIARY COMPOSITION.

1,308,463.      Specification of Letters Patent.      Patented July 1, 1919.

No Drawing.      Application filed September 25, 1918. Serial No. 255,617.

*To all whom it may concern:*

Be it known that I, GEORGE WILLIAM CUTLER WEBB, a subject of the King of Great Britain, residing at Cartridge Works, Dartford, in the county of Kent, England, have invented certain new and useful Improvements in or Relating to Incendiary Compositions, of which the following is a specification.

This invention relates to incendiary compositions for use in shells, incendiary bullets, and for other purposes, of the type employing granulated or powdered metal in conjunction with an oxygen supplying ingredient.

According to this invention we add to an incendiary composition of the above type a suitable proportion of the oxid or carbonate of an alkaline earth metal (magnesium, calcium or barium) or a mixture thereof, and subject the composition to high compression or slake with water so that it is made into a coherent mass. Preferably compression is used with the composition in a dry state, if the shell or bullet is so formed as to permit pressure being applied over the whole end surface of the composition when in place. A pressure of about two to five tons per square inch is found to give satisfactory results and to form a coherent mass. In cases where it is not practicable to apply pressure over the whole end surface the composition may be caused to set by the addition of water in which case the alkaline earth oxid should be used.

It is also found advantageous to add a small proportion of paraffin oil, preferably not more than 3 per cent. of the composition. The mixing is preferably effected in a Werner-Pfleiderer mixing machine, the dry ingredients being put in first and mixed for a short period when the paraffin oil is put in and all the ingredients finally mixed. The addition of the oil tends to make a more uniform mixture as owing to the differing weights of the ingredients there is a tendency to separate out before the composition is pressed, which tendency is greatly decreased by the paraffin. The paraffin oil also tends to prevent oxidation of the combustible ingredients.

The metal and the oxidizing agent employed may both vary, for example, granulated or powdered magnesium or aluminium being employed together with a nitrate or peroxid, barium nitrate being usually preferred. The metal particles are coated with paraffin wax or resin or a mixture of these substances.

A typical composition prepared in accordance with this invention and suitable for the slaking method consists of about 27 parts of granulated or powdered magnesium coated with about 25 per cent. of paraffin wax, resin or a wax and resin mixture, about 63 parts of barium nitrate and, say, 10 parts of magnesium oxid or carbonate or the oxid or carbonate of calcium or barium or a mixture thereof. For the dry pressure method the proportion of alkaline earth would be substantially increased. If the slaking method is employed the ingredients may be mixed dry and the necessary water added or the metal and nitrate mixed in with the slaked magnesium oxid, the resulting mixture being pressed into the shell or other container and dried for some time at a moderate temperature, the material setting into a firm, coherent mass. The alkaline earth serves as a slowing agent or retarder of combustion and the rate of combustion can be regulated by altering the proportion of the oxid or carbonate within practicable limits.

The following are four specific examples of combustible compositions in accordance with this invention:—

For a slaked composition with relatively small proportion of alkaline earth:
Magnesium oxid, 1.1 part.
Wax coated magnesium, 3.7 parts.
Barium nitrate, 7 parts.
Water sufficient to obtain setting of the composition.

For dry pressed compositions with larger proportions of alkaline earth:
Magnesium oxid, 3.45 parts.
Wax coated magnesium, 3.7 parts.
Barium nitrate, 7 parts.
Or
Magnesium oxid, 3.45 parts.
Resin coated magnesium, 5.6 parts.
Barium nitrate, 7 parts.
Or
Magnesium oxid, 5.45 parts.
Wax coated magnesium, 3.7 parts.
Barium nitrate, 7 parts.

In place of the magnesium oxid any of the equivalent materials referred to or a mixture thereof may be employed.

In addition to the ingredients mentioned in any of the examples paraffin oil up to about 3 per cent. may be mixed in as already described.

What I claim and desire to secure by Letters Patent of the United States is:—

1. An incendiary composition comprising granulated metal, an oxidizing agent and an alkaline earth, the mixture being made into a coherent mass by compression to a high pressure.

2. An incendiary composition comprising granulated metal, an oxidizing agent and an alkaline earth, the mixture being made into a coherent mass by compression to a pressure of from two to five tons per square inch.

3. An incendiary composition comprising granulated metal, an oxidizing agent and an alkaline earth, the mixture being made into a coherent mass by slaking the mixture.

4. An incendiary composition comprising granulated metal, an oxidizing agent, paraffin oil and an alkaline earth, the mixture being made into a coherent mass by compression.

5. An incendiary composition comprising granulated magnesium, an oxidizing agent and the oxid of an alkaline earth metal, the mixture being made into a coherent mass by compression.

6. An incendiary composition comprising granulated magnesium, a nitrate and magnesium oxid, the mixture being made into a coherent mass by compression.

In testimony whereof I affix my signature.

GEORGE WILLIAM CUTLER WEBB.